US006478221B1

(12) United States Patent
Sommerville

(10) Patent No.: US 6,478,221 B1
(45) Date of Patent: Nov. 12, 2002

(54) SELF-SERVICE TERMINALS

(75) Inventor: David Sommerville, Scotland (GB)

(73) Assignee: NCR Corporation, Dayton, OH (US)

( * ) Notice: Subject to any disclaimer, the term of this patent is extended or adjusted under 35 U.S.C. 154(b) by 22 days.

(21) Appl. No.: 09/636,834

(22) Filed: Aug. 14, 2000

(30) Foreign Application Priority Data

Aug. 17, 1999 (GB) ............................................ 9919290

(51) Int. Cl.[7] ............................................ G06F 17/60
(52) U.S. Cl. ........................................ 235/379; 235/383
(58) Field of Search ................................ 235/383, 379; 186/61; 705/17

(56) References Cited

U.S. PATENT DOCUMENTS

| | | | | | |
|---|---|---|---|---|---|
| 5,071,031 | A | | 12/1991 | Yuge et al. | |
| 5,185,555 | A | * | 2/1993 | Nishibe | 235/379 |
| 5,412,189 | A | * | 5/1995 | Cragun | 235/379 |
| 5,589,855 | A | * | 12/1996 | Blumstein et al. | 235/379 |
| 5,979,757 | A | * | 11/1999 | Tracy et al. | 235/383 |
| 6,023,688 | A | * | 2/2000 | Ramachandran et al. | 705/44 |
| 6,056,087 | A | * | 5/2000 | Addy et al. | 186/61 |
| 6,061,666 | A | * | 5/2000 | Do et al. | 705/43 |
| 6,084,528 | A | * | 7/2000 | Beach et al. | 235/383 |
| 6,186,396 | B1 | * | 2/2001 | Crandall, Jr. | 235/379 |
| 6,332,571 | B1 | * | 12/2001 | Arima et al. | 235/379 |
| 6,384,743 | B1 | * | 5/2002 | Vanderheiden | 341/21 |

FOREIGN PATENT DOCUMENTS

| | | |
|---|---|---|
| EP | 0583896 | 2/1994 |
| EP | 0720131 | 7/1996 |
| WO | 9827533 | 6/1998 |

* cited by examiner

*Primary Examiner*—Michael G. Lee
*Assistant Examiner*—Ahshik Kim
(74) *Attorney, Agent, or Firm*—Peter H. Priest

(57) ABSTRACT

A self-service terminal (SST) (10) is provided comprising a plurality of user interfacing elements (12, 14, 16, 18, 20, 22, 24) and a plurality of sound issuing arrangements (28, 30). The sound generated may be modulated to provide sound with an apparent source in the vicinity of a selected user interfacing element, so that a user's attention may be directed to the appropriate element, and so the user may be guided through the steps of a transaction. The invention may be provided in conjunction with conventional visual attention-directing devices, such as LEDs (26).

20 Claims, 1 Drawing Sheet

SELF-SERVICE TERMINALS

BACKGROUND OF THE INVENTION

The present invention relates to self-service terminals (SSTs). More particularly, the invention relates to directing a user's attention to relevant elements of an SST during a transaction, and to guiding a user through the stages of a transaction. The invention also relates more generally to assisting a user in identifying locations.

Self-service terminals (SSTs), such as automated teller machines (ATMs), are in wide usage and are being used to execute increasingly complex transactions. As the complexity of transactions increases, so too does the complexity of the SSTs. All SSTs feature a number of different user interfacing elements which require a user's attention at different stages in a transaction: for example, most ATMs feature identification card readers, numeric keypads, display screens, cash dispense slots, media deposit slots and receipt dispense slots, and all of these elements may be utilized at least once even in a relatively straightforward transaction. Thus, "navigating" the fascia of an unfamiliar SST may prove daunting or difficult.

Locating the relevant user interfacing elements presents a particular problem with relatively large SSTs such as financial service centers (FSCs), which aim to provide a wide range of banking or financial services to users who may not have ready access to conventional banking facilities. Thus, such FSCs may have a large number of user interfacing elements, and are liable to be used by people who may be unfamiliar with SSTs, or use them infrequently.

It has been recognized that such a plethora of elements may prove confusing or distracting to a user, therefore many SSTs make use of devices for directing a user's attention to the appropriate area of the SST fascia during the course of a transaction: for example, a flashing light may identify the next element to be used in the transaction sequence; a display screen may show animated arrows or signs directing attention appropriately; or written instructions may be provided on the SST fascia.

However, such attention-directing devices are solely visual, and therefore would not serve their purpose when the SST was being used by a visually-impaired person, or if areas of the SST are obscured by glare from bright sunlight or the like. Furthermore, the use of visual cues requires that the user be looking in the appropriate direction to notice the cue; in an SST with a large fascia, such as an FSC, elements may be a meter or more apart.

Attempts have been made to aid user interaction with user interfacing elements of SSTs by incorporating loudspeakers into SST fascias, such loudspeakers generating a noise such as a beep, or a series of beeps, for alerting the user that some action is required. Typically however a single loudspeaker is mounted in the SST, and so may only serve to attract attention generally, rather than to a specific element of the SST. Thus, this still requires the user to locate the appropriate element in the SST fascia, and in larger SSTs may actually hinder use of the SST, as the loudspeaker may be located some distance from the next element requiring a user's attention. Further, a sharp "beeping" sound such as is often used may serve only to induce stress or panic in a user unfamiliar with SSTs.

SUMMARY OF THE INVENTION

It is among the objects of embodiments of the present invention to obviate or alleviate one or more of these and other disadvantages of existing SSTs.

According to a first aspect of the present invention there is provided a self-service terminal (SST) comprising a plurality of user interfacing elements, and means for producing sound for directing a user's attention to a selected one of said user interfacing elements.

Preferably, said means comprises a plurality of loudspeakers or other sound producing or issuing arrangements; in the interests of brevity, reference will be made herein primarily to loudspeakers and speakers. This enables sounds to be produced at more than one location on the SST, so as to direct attention to a selected area of the SST. More conveniently, it is known that appropriate control of relative sound levels, or balance, in at least two loudspeakers can produce sound which appears to emanate from a desired particular location between the speakers. Thus, with appropriate speaker location and balance control, an apparent source of the sound may be selected for directing attention to the desired element of the SST spaced from the speakers.

Preferably, the SST further comprises a processing unit which controls the loudspeakers, to generate relative sound levels such as to provide an apparent source of sound at or adjacent to a selected user interfacing element.

Preferably also, the SST further comprises additional attention directors, such as visual aids. These may assist the user's identification of the element requiring their attention.

Preferably also, the SST further comprises means for modulating the output of the loudspeakers over time, such that the apparent source of the sound moves from the previous element used towards the next element to be used. Such a "moving" sound may be more effective at directing a user's attention than a "static" sound. Conveniently, this modulating means is incorporated in the processing unit for controlling the loudspeakers.

In one embodiment of the invention, the generated sound may be of a low intensity. These sounds may be detected by the user at only a low level of consciousness, or even subconsciously, so directing the user's attention with little if any stress resulting from the user's exposure to unfamiliar sounds. Of course, the SST may also be capable of generating a range of sounds, such that if attention is required more urgently, or if the user has not interacted with the appropriate element within a predetermined period, then appropriate, perhaps more strident attention directing sounds may be generated.

According to a second aspect of the present invention there is provided an attention-directing unit for mounting on a self-service terminal (SST) having a plurality of user interfacing elements, the unit comprising a plurality of spaced sound issuing outputs and a processing unit for controlling said outputs to provide an apparent sound source location on the SST for directing a user's attention to selected elements of the SST.

According to a further aspect of the present invention there is provided a method of directing a user's attention to one of a plurality of user interfacing elements of a self-service terminal (SST), the method comprising the step of: generating sound with an apparent source in the vicinity of a selected user-interfacing element.

Preferably, the method further comprises the step of: modulating the generated sound such that the apparent source of the sound moves from the location of a previous selected element of the SST to the location of a current selected element of the SST.

Preferably, the method further comprises the step of generating additional attention-directing signals, such as visual signals.

According to a still further aspect of the present invention there is provided a method of directing a user's attention to one of a plurality of locations, the method comprising the step of: generating sound with an apparent source in the vicinity of a selected location.

According to a still further aspect of the present invention there is provided an apparatus for directing a user's attention to one of a plurality of locations, the apparatus comprising a plurality of sound issuing outputs and a processing unit for controlling said outputs to direct a user's attention to desired locations.

These still further aspects of the present invention may be used in applications other than SSTs; the invention may be used in any situation where directing attention of a user is desired or required, for example, complex control panels, such as those found on aircraft flight decks, or in electricity generating plants, where failure to locate a particular warning light or gauge may have potentially catastrophic consequences.

BRIEF DESCRIPTION OF THE DRAWINGS

These and other aspects of the present invention will now be described by way of example only and with reference to the accompanying drawings, in which.

DETAILED DESCRIPTION

Figure 1:
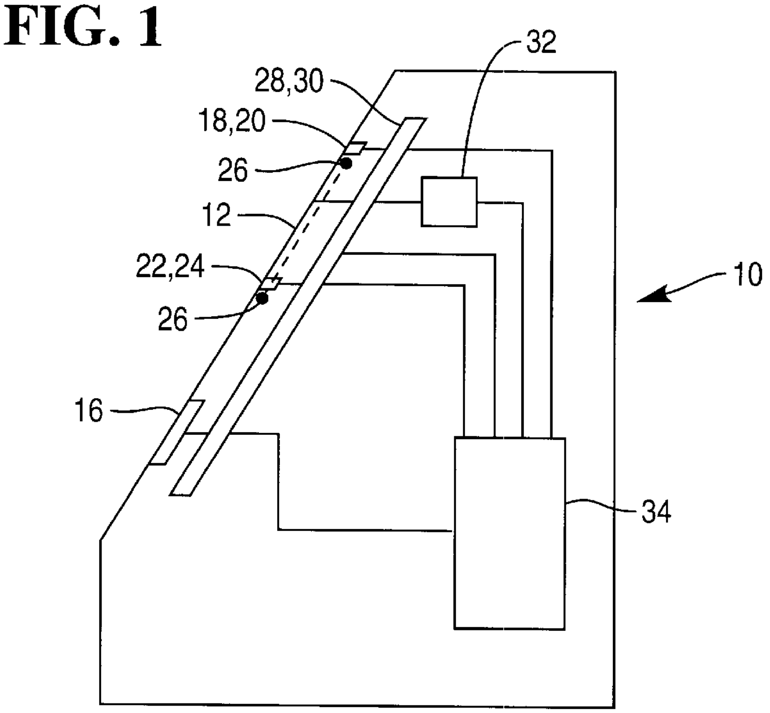
FIG. 1 shows a diagrammatic cross-section of a self-service terminal (SST) according to an embodiment of the present invention.
Figure 2:
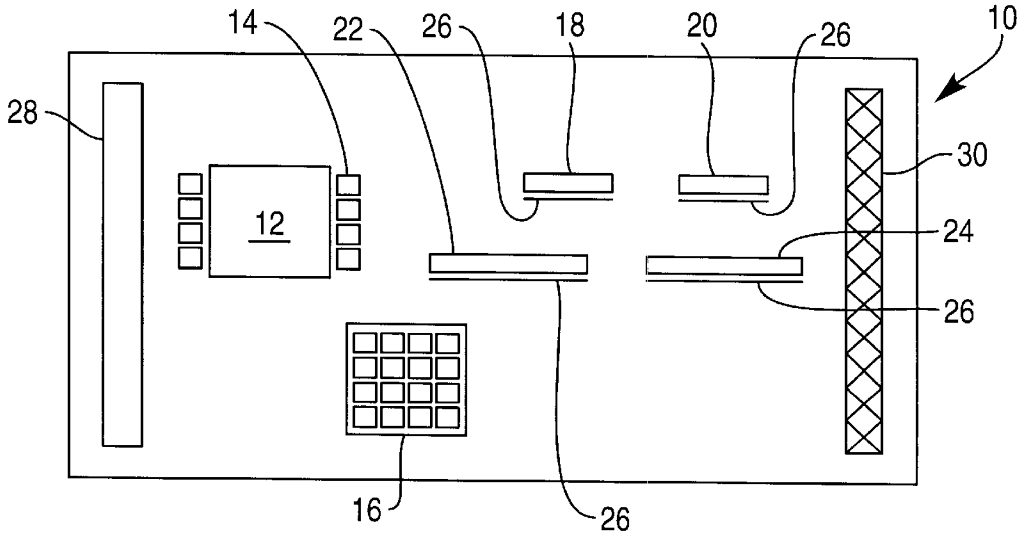
FIG. 2 shows the fascia of the SST of FIG. 1.

FIGS. 1 and 2 show sectional and front views of a self-service terminal (SST) 10 according to an embodiment of the present invention. The SST 10 includes a number of user interfacing elements, such as a display screen 12 with associated data entry keys 14, a numeric keypad 16, a magnetic card reader slot 18, a receipt dispensing slot 20, a cash dispense slot 22, and a media deposit slot 24. Each of these features is known in the art, and will not be described in detail. The four slots 18, 20, 22, 24 each are situated adjacent a respective LED 26; a selected LED 26 may flash to draw a user's attention to the respective slot 18, 20, 22, 24 at an appropriate point in the transaction. The SST 10 further comprises a pair of speaker units 28, 30, used to generate sound for drawing a user's attention to the appropriate element of the SST 10. The speaker units 28, 30 are controlled by a processor unit 32, which determines the appropriate sound balance to locate the apparent sound source produced by the speakers at or adjacent an appropriate user interfacing element. The processor unit 32 contains a number of sound files, each file associated with a particular user interfacing element, and containing predetermined balance control information for providing an apparent sound source at the element location; when an element is activated or in use, the information from the appropriate sound file is utilized to control the speaker units 28, 30.

If each of the speaker units 28, 30 only incorporate a single loudspeaker, the units 28, 30 may only generate sound with an apparent source which varies along a single axis across the fascia of the SST 10. However, if the units 28, 30 each comprise two loudspeakers, one at each corner of the SST fascia, it is possible to generate an apparent sound source at any position on the fascia of the SST.

A further processor unit 34 controls the other features of the SST 10, including the user interfacing elements 12, 14, 16, 18, 20, 22, 24 and the visual attention-directing devices 28. Of course, the processors 32, 34 may alternatively be provided as a single integrated processing unit, controlling all the various functions. The former embodiment would be most appropriate where the present invention comprises a separate loudspeaker and processor unit to be retrofitted to an existing SST or incorporated in an existing SST configuration, and the latter embodiment would be appropriate where a complete SST is manufactured according to the present invention.

In use, for example, a user may insert their magnetic strip card into the card reader slot 18, which is associated with a conventional flashing LED 26. In addition, the speaker units 28, 30 may produce a sound or tone with an apparent source at or adjacent the slot 22. Alternatively, the speaker units 28, 30 may issue explicit prompts or instructions, for example:

"Welcome to the Airdrie Savings Bank, please insert your card here." Such prompts may be produced when a user is detected in front of the terminal by an appropriate proximity sensor. On inserting the card, the display 12 shows instructions for the user to enter their PIN, while the speaker units 28, 30 generate a sound with an apparent source in the vicinity of the keypad 16.

The user then proceeds with the transaction as normal, and may, for example, request the dispensing of a sum of cash. Banknotes are dispensed from the cash dispense slot 22, to which the user's attention may be drawn by a flashing LED 26 and a further sound generated by the speaker units 28, 30 with an appropriate apparent source at or adjacent the slot 22.

After the user has obtained their banknotes, a receipt may be issued from receipt dispensing slot 20 and the card returned from reader slot 18, both of which activities may be accompanied by appropriately-directed sounds.

In this manner a user may be led through the steps of a transaction.

The relative levels of sound generated by the speaker units 28, 30 may also be modulated over time to generate the illusion that the source of the sound is moving between elements or toward an appropriate user interfacing element to more effectively draw a user's attention.

It will be apparent from the foregoing that the present invention provides an effective alternative or additional means of drawing a user's attention to relevant areas or elements of an SST during a transaction, and which does not rely on visual signals or cues. It will further be apparent that various modifications and improvements may be made to the above-described apparatus without departing from the scope of the invention. For example, where an SST is provided in a booth or the like, loudspeakers may be placed around the booth, that is, spaced from the SST fascia, to allow the apparent source of sound to be varied in three dimensions. Further, the present invention is not limited to use in relation to SSTs, but may be utilized, for example, in control panels where an operator has a large number of gauges or other read-outs to observe, and sound may be used to highlight the location of a selected gauge. Also, the present invention may be utilized to assist in the location of, for example, emergency exits, and a "moving" sound source may be useful in providing guidance as to the location of the nearest emergency exit, particularly where visibility is poor, for example, in a smoke-filled aircraft.

What is claimed is:

1. A self-service terminal comprising:

a plurality of user interfacing elements; and a sound generator in a fixed spatial relation to the terminal for producing sound having an apparent source near one or more of the user interfacing elements, the sound generator producing sound having one or more fixed actual sources, the sound generator being operative to control characteristics of the sound produced in order to change the apparent source of the sound so as to give the sound an apparent source near a particular user interfacing element in order to draw the user's attention to that element when user attention to that element is needed, the proximity of the apparent location of the sound to the element tending to draw the user's attention to the element.

2. A self-service terminal according to claim 1, wherein the sound generator includes a plurality of spaced sound issuing locations.

3. A self-service terminal according to claim 2, wherein the sound generator includes a processing unit for controlling the relative sound levels issued from each of the locations to selectively provide apparent sources of sound spaced from the locations.

4. A self-service terminal according to claim 3, wherein the sound generator includes means for modulating the relative sound levels issued from each of the locations over time to selectively provide moving apparent sources of sound.

5. A self-service terminal according to claim 1, wherein the generated sound is of a low intensity.

6. A self-service terminal according to claim 1, further comprising non-audible attention-directing means for directing a user's attention to a selected one of the user interfacing elements.

7. An attention-directing unit for mounting on a self-service terminal (SST) having a plurality of user-interfacing elements, the attention-directing unit comprising:

a plurality of spaced sound issuing outputs arrayed in a fixed relationship to the SST; and a processing unit for controlling the outputs to produce sound having characteristics chosen to provide an apparent sound source location on the SST, the sound source location serving to direct a user's attention to a selected one of the user interfacing elements, the relation between the apparent location of the sound to a location of the element tending to draw the user's attention to the element.

8. An attention-directing unit for mounting on a self-service terminal (SST) having a plurality of user-interfacing elements, the attention-directing unit comprising:

a plurality of spaced sound issuing outputs arrayed in a fixed relationship to the SST; and a processing unit for controlling the outputs to produce sound having characteristics chosen to provide an apparent sound source location in the vicinity of a selected one of the user interfacing elements to direct a user's attention to a selected one of the user interfacing elements, the proximity of the apparent location of the sound to the element tending to draw the user's attention to the element.

9. A method of directing a user's attention to one of a plurality of user interfacing elements of a self-service terminal, the method comprising:

selecting a user interfacing element to which a user's attention should be drawn; and generating sound emanating from the SST, the sound having characteristics chosen to give the sound an apparent source in the vicinity of the selected user interfacing element, the proximity of the apparent location of the sound to the element tending to draw the user's attention to the element.

10. A method according to claim 9, further comprising:

modulating the generated sound such that the apparent source of the sound moves from the location of a previously selected user interfacing element to the location of a currently selected user interfacing element.

11. A method according to claim 9, further comprising:

generating additional non-audible attention-directing signals.

12. A method of operating a self-service terminal having a plurality of user interfacing elements, the method comprising the step of:

(a) selecting a user interfacing element to which a user's attention should be drawn; and (b) producing sound emanating from a plurality of spaced sound issuing locations arranged in a fixed relationship to the self-service terminal, the sound having characteristics chosen to give the sound an apparent location near a selected user interfacing element in order to direct a user's attention to the selected user interfacing element, the proximity of the apparent location of the sound to the element tending to draw the user's attention to the element.

13. A method according to claim 12, wherein step (b) includes the step of:

(b-1) controlling the relative sound levels issued from each of the plurality of spaced sound issuing locations to selectively provide apparent sources of sound spaced from the locations.

14. A method according to claim 12, wherein step (b) includes the step of:

(b-1) modulating the relative sound levels issued from each of the locations over time to selectively provide moving apparent sources of sound.

15. A method according to claim 12, wherein the generated sound is of a low intensity.

16. A method according to claim 12, further comprising the step of:

(c) directing a user's attention to a selected one of the user interfacing elements by an additional means which does not involve the use of sound.

17. A method according to claim 12, further comprising the step of:

(c) visually directing a user's attention to a selected one of the user interfacing elements.

18. A method of operating a self-service terminal having a plurality of user interfacing elements, the method comprising:

selecting a user interfacing element to which a user's attention should be drawn; and controlling a plurality of spaced sound issuing outputs arranged in a fixed relationship to the self-service terminal to produce sound having characteristics chosen to provide an apparent sound source location in the vicinity of a selected one of the user interfacing elements to direct the user's attention to the selected one of the user interfacing elements, the proximity of the apparent location of the sound to the element tending to draw the user's attention to the element.

19. A method according to claim 18, further comprising:

directing a user's attention to a selected one of the user interfacing elements without use of sound.

20. A method according to claim 18, further comprising:

visually directing a user's attention to a selected one of the user interfacing elements.

* * * * *